Patented Dec. 24, 1940

2,225,734

UNITED STATES PATENT OFFICE

2,225,734

ELECTROLYTIC METHOD OF MAKING SCREENS

Watson Beebe, Detroit, Mich., assignor, by mesne assignments, to The Trumbull Metal Products Company, a corporation of Delaware; Edward B. Busby, Detroit, Mich., as trustee No Drawing. Application December 10, 1937, Serial No. 179,109

3 Claims. (Cl. 204—11)

This invention relates to screens and method of making the same and more particularly to a process wherein metal is electrolytically deposited to form screens or other apertured members and to the members thus formed.

The invention is adapted for use in forming a wide variety of articles and is especially well adapted for forming fine, accurate screens or members having screen portions, suitable for uses such as photo-engraving screens, artists' retouching screens, classifying screens, filter screens, protective screens and others.

In accordance with one embodiment of the invention, a member, such as a plate, is provided with non-conducting areas corresponding to the apertures in the screen to be formed, and metal is deposited on the conductive portions of the plate to form the screen, whereafter the electrodeposited screen is removed from the plate.

The non-conductive areas may be formed in various ways, and in accordance with one embodiment of the invention, a non-conductive light-hardenable coating is applied to the plate and predetermined areas thereof exposed to light through a screen corresponding in pattern to the screen to be formed. The exposed areas are thus light-hardened and the unexposed portions of the coating are removed. The plate, with the non-conducting material thereon is treated to insure adherence of the coating to the plate and the plate arranged as a cathode in an electrolytic cell, thereby to deposit directly on the conducting areas of the plate the metal or metals which are to form the screen. The operating conditions of the electro-deposition are suitably controlled to produce a deposition of material having the desired thickness and metallic structure. Thereafter, the plate with the electrodeposited material is heat-treated to cause the non-conductive material to harden and adhere to the plate and the deposited screen is stripped from the plate.

A feature of the invention is the forming of fine, accurate screen or members having screen portions, of integral construction and having apertures of predetermined size and arrangement and parallel walls, and which retain such arrangement during use.

Another feature of the invention is the forming of screen or like members having predetermined metallic structure which is uniform throughout all portions of the structure or which varies in a predetermined manner.

Still another feature of the invention is the deposition of metal directly upon the cathode of an electrolyte cell and the subsequent stripping of the deposited member without the adherence of foreign matter of any kind.

The invention further consists in the new and novel features of operation and the new and original arrangements and combinations of steps in the process hereinafter described and more particularly set forth in the claims.

The invention also consists in forming a product having the general characteristics, the new and useful applications, and the several original features of utility hereinafter set forth and claimed.

It will be understood that the present invention is capable of wide application, but for the purposes of illustration it is described in connection with the formation of the screen suitable for use as a photo-engraving screen.

A master plate (hereinafter called the "cathode plate") is provided, which is formed from material which is resistant to rusting and corrosion, which has sufficient rigidity and surface hardness, and which permits the electrolytic deposition of metal directly thereon and the subsequent stripping of the deposited member without the necessity for using a parting agent. While this plate may be constituted by a base or support having a suitable coating or facing thereon, it is usually preferable to form it from a single member constituted by a suitable metal or alloy. It will be understood that in certain cases the "cathode plate" may be replaced by a cathode of other form such as a rod, bar, block or other form.

Where the member to be formed is to have a smooth face, the face or faces of the cathode plate which are to receive the metal deposit preferably are made as smooth and level as possible. The faces are then preferably provided with a satin finish in order to insure that the deposited metal will adhere thereto during the electrodepositing operation.

The cathode plate is next provided with a thin coating of material capable of being hardened when exposed to light. This material is of such composition as to permit rapid photographing of a design or pattern therein and one which can be treated to cause it to adhere tenaciously to the cathode plate during subsequent operations. Furthermore, this material should be such that when light hardened, it will be acid-resisting and non-conducting, or sufficiently non-conducting, to prevent the deposition of metal thereon when subjected to electrolytic action.

The light-hardenable material may comprise one of the so-called chromated fish glues, such as one including fish glue, albumin, ammonium bichromate, and water. This material should be sufficiently fluid to permit it to be applied to the surface or surfaces of the cathode plate in a thin, uniform film.

The light-hardenable material may be applied to the cathode plate in any suitable manner but it is preferably flowed on to the plate and the latter is rotated or whirled until the film of material is dried thereon in the form of a thin, uniform layer or coating. Thus the coating will be uniform in thickness and will not have any air bubbles or other irregularities therein.

One or more suitable screens are provided which have opaque lines or areas thereon forming a negative of the non-conductive pattern which is to be produced on the cathode plate. Preferably, one or more master photo-engraver's diamond ruled screen plates are employed, or a reduction or enlargement thereof. As will be understood by those skilled in the art, various patterns may be produced by simultaneous or successive use of two or more of such plates, the lines of which may be arranged at various angles to produce the various patterns.

The pattern may comprise minute areas or so-called "dots" having various shapes, such as square, rectangular, circular, elongated and many others and various combinations thereof. Preferably, it is desirable to provide a non-conductive border adjacent the edges of the cathode plate whereby to facilitate stripping of the screen from the cathode. A suitable area may be provided for electrical connection of the plate; preferably, the area is adjacent the edge to permit a clip for electrical connection to be engaged thereover.

The light-hardenable coating on the cathode plate is exposed through the master screen or screens, to a suitable light, such as is produced by an arc light, for sufficient time until all of the exposed areas are sufficiently hardened. The coating is then developed, as by washing with water until all of the unexposed, light-hardenable material is removed, thus leaving the exposed, light-hardened material in the form of the desired pattern.

The cathode plate, with the adhering light-hardened pattern, is then dried. Preferably the drying is accomplished by whirling or rotating the plate and this may be carried out in a temperature from 100° to 150° F. to expedite the drying.

The cathode plate, carrying the non-conductive pattern thereon, is then treated in order to further harden the non-conducting material and to cause it to adhere tenaciously to the plate. This can be accomplished by baking the plate and adherent coating at a temperature at from 300° to 400° F., and preferably around 350° F., until the coating attains a dark chocolate color. Care should be taken to insure that the coating material is not carbonized either by the application of too intense heat or baking for too long a period. The cathode plate is now ready to receive the metal by electrolytic deposition.

It will be understood that where it is desirable to deposit a screen or other suitable member on the other face of the cathode plate, such face will be treated in a manner similar to that just described, in order to provide thereon a suitable non-conducting pattern. The second face may have a pattern which is similar or dissimilar to the pattern on the first face.

The cathode plate is suitably supported in an electrolyte corresponding to the material to be deposited, and a suitable anode or anodes are provided which are also immersed in the electrolyte. The anode and cathode plate are connected to a suitable source of electric current and current is passed through the cell thus formed.

The screen may be formed from any suitable material or materials, such as copper, nickel, chromium, lead, tin or other non-ferrous metals or alloys depending upon the use to which the screen is to be put and the characteristics desired. It will be understood that where the term "metal" is used herein, it is to be taken as meaning metal, one or more metals, alloys, or one or more alloys and is not limited to a single, elementary metal. I have found that screens suitable for a large number of uses may be formed from copper which may, if desired, be provided with a plated coating of another metal.

Where a copper screen is to be formed, a copper anode is provided and the electrolyte preferably is constituted by copper sulphate, sulphuric acid and water in suitable proportions.

The circuit is energized and copper is electrolytically deposited on the exposed, conducting areas of the cathode plates. I prefer to employ a cathode plate of suitable composition and characteristics and to dispense with the use of a separating or parting agent, such as usually employed; the deposit is effected directly onto the bare surfaces of the cathode plate.

Deposition is continued until the desired thickness of material is built up on the cathode plate to form a screen corresponding in shape to the exposed areas of the cathode and having an aperture pattern corresponding to the non-conductive pattern on the cathode plate. Where the screen to be formed is to have a thickness exceeding about 0.004 or 0.005 inch, it is preferable to halt the deposition at a thickness of about 0.004 or 0.005 inch in order to prevent the apertures "capping over" by reason of the deposition of material which fills up the apertures. Further deposition may be carried out after stripping from the cathode plate, as hereinafter explained.

The various operating factors such as current density, ratio of anode and cathode area, spacing between the anode and cathode, composition of the electrolyte, temperature of the electrolyte, and agitation of the electrolyte are carefully controlled to provide a deposit of material having the desired hardness, density, grain structure, tensile strength, brightness and the like.

Where it is desired to produce a screen having uniform metallic structure, it is important that the several operating characteristics be maintained uniform throughout the entire deposition. I have also found that it is important that the cathode plate be brought to and remain at the temperature of the electrolyte during the entire period of the deposition. For this reason, I prefer to bring the cathode plate to the temperature of the electrolyte before connecting in the electrical circuit. Thus, non-uniformity in metal structure, which would otherwise occur owing to the formation of bubbles and other causes, is substantially avoided.

When the desired thickness of metal is deposited, the cathode plate is disconnected from the circuit, removed from the electrolyte, and washed in water. Thereafter, the plate, with the pattern of non-connecting material and the deposited metal, is baked at a temperature of from 300° to 400° F., and preferably around 350° F. for a suitable period, for example, approximately three minutes. Thus, when the deposited screen is stripped from the cathode plate, the non-conducting material adheres to the plate with great tenacity and is not removed with the deposited member.

The deposited member is then stripped from the cathode plate by any suitable means, as for example, either manually or by suitable mechanical or semi-mechanical means.

Where it is desired to form a screen exceeding 0.004 or 0.005 inch in thickness, the screen after removal from the cathode may be returned to the bath and metal deposited on both sides of the screen to build such screen to the desired thickness. Thus, a screen can be formed with apertures of substantially uniform diameter throughout the thickness of the screen and having side walls extending substantially perpendicular to the faces of the screen.

Preferably, the screen is secured in a suitable frame, as for example, a frame formed from wood or synthetic resin or other suitable material, the screen being drawn taut in the frame to prevent uneven deposition of metal thereon. The screen is immersed in the electrolyte, connected as a cathode in the electric current and a further deposition made of either the same or a different metal.

It will be understood that screens may be formed by the present process ranging in thickness from 0.00025 inch up to any desirable and practical thickness. Generally, screens for photographic purposes will range in thickness from 0.0015 to 0.002 inch; filter and classifying screens will usually range from 0.003 to 0.012 inch; screens for other purposes may be formed considerably thicker if desired.

Where the screen is to be used for certain purposes, it is often desirable to provide a plated coating of another material, as for example, nickel, chromium or the like. This operation can be carried out conveniently by supporting the screen in a suitable electrolyte and subjecting it to an electro-plating operation.

The present invention provides a method of forming an integral, apertured member, such as a screen, wherein the apertures are accurately formed and provided with sharp, clean-cut rims. Each face of the screen, including the rims or edges of the apertures, lies in a single plane and the screen may be made so thin that both faces in effect lie in a single plane. The side walls of the apertures may be made substantially perpendicular to the faces of the screen.

The screen may be formed from any one of a number of metals or alloys having characteristics suitable for various uses. The screen may have a uniform metal structure, or if desired, the operating conditions may be suitably controlled so that various areas or layers of the metal may have different characteristics. For example, the screen may have any desired degree of flexibility or hardness, and may be made harder in one area and softer in others.

The invention permits the production of a screen having apertures of which the size and spacing may be absolutely uniform or may vary in accordance with a predetermined design, but which, in any event, remain the same during the use and do not vary under the conditions of the intended use.

Since the electro-deposited metal may be deposited in an extremely thin coating and thus the contours of the plate and non-conductive pattern can be faithfully reproduced, and since a very fine accurate pattern can be produced in the plate by the present invention, it is possible to produce very fine screen. Both the apertures and the spacing between the apertures may be made extremely small. For example, it is possible to produce a screen having from 300 to 400 apertures per lineal inch, and in certain cases, even a greater number may be provided. The fineness of the aperture pattern is limited only by the closeness of the lines on the master screen which will permit light to penetrate therebetween.

By the use of a cathode plate of suitable composition and characteristics it is possible to deposit metal directly on the plate without the use of a separating or parting agent, such as has heretofore been considered necessary. The screen is thus deposited evenly and has a surface corresponding to the conductive surface of the cathode plate and when stripped is bright and clean. The deposited member can be stripped or peeled from the cathode plate readily and without the use of great force or the danger of injury to the deposited member or the surface of the plate.

While certain novel features of the invention have been disclosed and are pointed out in the annexed claims, it will be understood that various omissions, substitutions and changes may be made by those skilled in the art without departing from the spirit of the invention.

What is claimed is:

1. The method of forming metal screens which comprises forming on a metal plate a pattern of non-conducting material constituting a negative of the screen, heating the non-conducting material to render it adherent to said plate, electrolytically depositing on the non-coated areas of the plate a metal which is to form the screen, thereafter heating the non-conducting material to render it firmly adherent to the plate and stripping the deposited screen from said plate.

2. The method of forming metal screens which comprises forming on a metal plate a pattern of non-conducting material constituting a negative of the screen, baking the non-conducting material at a temperature from 300° F. to 400° F. to render it adherent to said plate, electrolytically depositing a metal on the non-coated areas of the plate to form a screen, thereafter braking the non-conducting material at a temperature of from 300° F. to 400° F. to render it adherent to the plate and stripping the deposited screen from said plate.

3. The method of forming a metal screen which comprises depositing a non-conducting material on a metal plate to form a plurality of dot-like projections upstanding from said plate and having their side walls substantially perpendicular to the face of the plate, heating said non-conducting material to harden it and to cause it to adhere to said plate, electrolytically depositing metal directly on the portions of the plate face not covered by said non-conducting material, heating said non-conducting material to cause it to adhere to said plate, and stripping said deposited metal from said plate.

WATSON BEEBE.